United States Patent [19]
Clusener et al.

[11] 3,805,589
[45] Apr. 23, 1974

[54] QUENCHING DILATOMETER
[75] Inventors: Gerhard R. Clusener, Great Neck; Ingo Kurth, Port Washington, both of N.Y.
[73] Assignee: Theta Industries, Inc., Port Washington, N.Y.
[22] Filed: Nov. 15, 1972
[21] Appl. No.: 306,846

[52] U.S. Cl. .................................................. 73/16
[51] Int. Cl. ......................................... G01n 25/16
[58] Field of Search .................................. 73/15, 16

[56] References Cited
UNITED STATES PATENTS
3,680,357  8/1972  Clusener ............................... 73/16
3,377,838  4/1968  Kanazawa et al. ..................... 73/16
2,351,572  6/1944  Kingston ............................... 73/16

OTHER PUBLICATIONS
Etter "A Compact High Temperature Dilatometer" in The Review of Scientific Instruments Vol. 41, No. 7, July 1970, pp. 1,026–1,028.
Garn et al. "Analytical Applications of a Differential Thermal Analysis Apparatus" in Analytical Chemistry Vol. 29 2 February 1957, pp. 271–275.

Primary Examiner—Herbert Goldstein
Attorney, Agent, or Firm—Leonard H. King

[57] ABSTRACT

In a dilatometer, of the type having a linear, variable, differential, transformer and push rod means responsive thereto, means are provided for rapidly heating and cooling a test sample which is freely suspended between mounting rods. The linear, variable, differential transformer includes individual, cantilevered spring support means and a ball anvil that provides the coupling means between the transformer and a micrometer that is used for calibration and zeroing purposes. The mounting rods for the test sample are outside the heating zone and do not expand themselves so that no correction for measuring system expansion is required. Structure for inside and outside quenching of the test sample is provided. In one embodiment of the invention a heating coil positioned around the test sample is provided in combination with a quenching head.

The aforementioned Abstract is neither intended to define the invention of the application which, of course, is measured by the claims, nor is it intended to be limiting as to the scope of the invention in any way.

18 Claims, 10 Drawing Figures

PATENTED APR 23 1974 3,805,589

QUENCHING DILATOMETER

BACKGROUND OF THE INVENTION

1. Field of the Invention

This invention relates generally to measuring instruments such as dilatometers and more particularly to improved means for rapid heating and cooling the test sample that is to be measured by the dilatometer.

2. Description of the Prior Art

Dilatometers are used for measuring the linear, thermal expansion of solids. They are also used for determining the coefficient of linear, thermal expansion as well as to detect phase transitions in a material for analytical purposes. Some applications of the dilatometer include a measurement of the change in the crystallographic structure of a material. That is, the transition point and softening point in plastics, or the continuous cooling curve transformation in steel. Another application of a dilatometer is the study of the compatibility of materials under changing temperature conditions. For example, metal to glass, enamel to substrates, thin film depositions on microcircuits or matching tooth fillings with the natural material of teeth. A dilatometer may also be used for process simulation such as firing of ceramics, heat treating of metals (annealing and quenching), sintering of powders and composite materials and measurement of minerals.

The common dilatometer consists mainly of three major sections which include a furnace with a temperature control, the actual dilatometer with a measuring unit and suitable recording equipment. There are many examples of commercial furnaces and programmers as well as recorders. However, there are only a very limited number of dilatometer measuring units. One widely used dilatometer has a ball bearing push rod support. This construction has the disadvantage of moving freely only under ideal conditions. Thus, dried out oil and improper adjustment make the functioning of the instrument questionable and hence the output of the device unreliable. Another form of dialtometer is illustrated and disclosed in U.S. Pat. No. 3,680,357 granted to Gerhard Clusener on Aug. 1, 1972. The structure described in the issued patent overcomes the shortcomings of the previously mentioned prior art and is particularly advantageous where only a limited space is available, such as vacuum chambers, hot cells, etc. The patented structure is compact and self contained to thereby minimize temperature and differential effects. A ball anvil couples a linear, variable, differential transformer that is adjustable and a micrometer that is used for calibration and zeroing purposes. Interleaved springs individually support the coil and the core of the linear, variable, differential transformer and the test sample is mounted between push rods one of which is responsive to the movement of the core. In the structure disclosed in the aforementioned issued patent, the workpiece is supported in a fused quartz tube that is adapted to be positioned within a furnace. When the furnace is brought up to temperature, the expansion of the test sample is transferred through the push rod into the measuring head. The differential transformer changes the variation in the length of the sample into an electrical signal and a demodulator conditions the signal for suitable recorder display.

SUMMARY OF THE INVENTION

The present invention utilizes the basic interleaved, cantilevered spring support structure disclosed in the aforementioned patent together with the micrometer and ball anvil coupling that is used for calibration and zeroing purposes. However, improved means are provided in the present invention for rapidly heating and cooling the test sample. This device utilizes a low mass oven. The dilatometer module is mounted on a base having passageway means for receiving a flow of a fluid cooling medium such as helium. One leg of an adjustable, U-shaped tube is mounted in the passageway and the other leg, supports one end of a tubular test sample. The other end of the tubular test sample is, in one embodiment, coupled to a tubular heat sink that is suitably secured coaxially and contiguously with the push rod or core of the dilatometer module. Means are provided in the heat sink for effluxing the cooling medium. One embodiment of the present invention provides for a water cooled heat source while another embodiment provides a heating coil positioned concentrically about the specimen within a separate quenching head.

Accordingly, it is the primary object of the present invention to provide an improved instrument for measuring the thermal properties of materials.

Another important object of the present invention is to provide an improved instrument for heating and cooling a test sample for subsequent measurement purposes.

A particular object of the present invention is to provide for quenching the outside surface of the test sample.

A further object of the present invention is to provide structure for quenching the inside surface of the test sample.

These and other features, objects and advantages of the invention will, in part, be pointed out with particularity, and will, in part, become obvious from the following more detailed description of the invention, taken in conjunction with the accompanying drawings which form and integral part thereof.

BRIEF DESCRIPTION OF THE DRAWING

In the various figures of the drawing, like reference characters designate like parts.

DESCRIPTION OF THE PREFERRED EMBODIMENT

Figure 1:
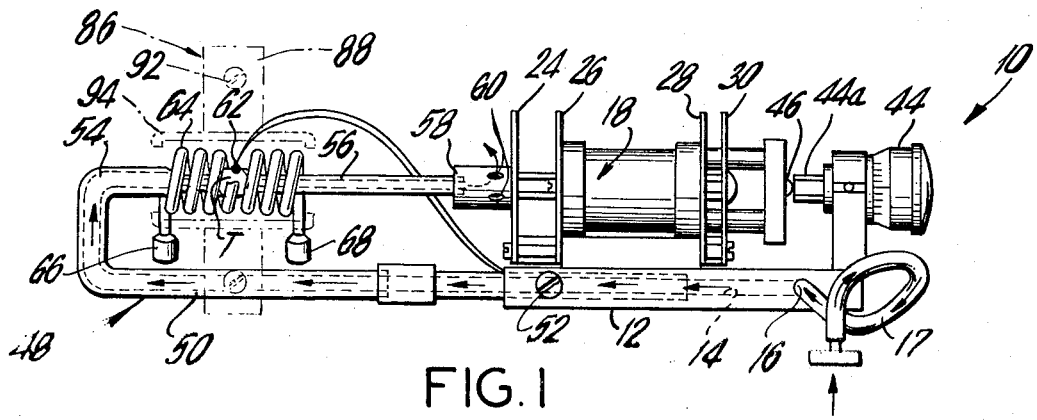
FIG. 1 is a side elevational view illustrating the quenching dilatometer comprising the present invention.

Referring now particularly to FIG. 1 of the drawing, there is shown a quenching dilatometer 10 comprising the present invention. An L-shaped base member 12 is provided with passageway means 14 having inlet means 16 for a cooling medium such as helium or the like that may be supplied from a suitable source not shown through tube 17.

Figure 2:
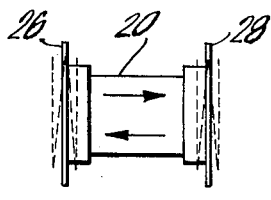
FIG. 2 is a schematic plan view illustrating the leaf spring support means for the axially displaceable coil portion of the dilatometer shown in FIG. 1.
Figure 2A:
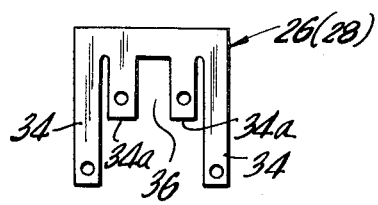
FIG. 2A is an elevational view of the leaf spring support means shown in FIG. 2.
Figure 3:
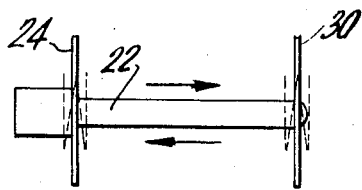
FIG. 3 is a schematic plan view illustrating the leaf spring support means for the axially displaceable core portion of the dilatometer shown in FIG. 1.
Figure 3A:
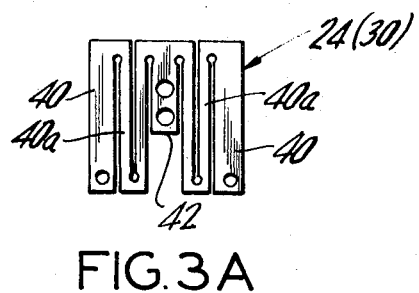
FIG. 3A is an elevational view of the leaf spring means shown in FIG. 3.

The dilatometer module 18 includes an axially movable coil 20 (FIG. 2) comprised of a primary winding and two secondary windings, the secondary windings being connected together in series, and an axially movable core 22 (FIG. 3) that is positioned coaxially within the coil 20. Interleaved, cantilevered beryllium bronze springs 24, 26, 28 and 30 independently and flexibly support the coil 20 and the core 22 substantially in the manner described in the aforementioned issued U.S. Pat. No. 3,680,357. As shown in FIG. 2, the coil 20 is flexibly mounted on a pair of axially spaced leaf springs 26 and 28, each of which is comprised of four side-by-side legs 34, the innermost two legs 34a being relatively widely spaced apart to define a gap 36 therebetween. The core 22 is similarly mounted on a pair of the axially spaced apart leaf springs 24 and 30, each of which is comprised of four side-by-side legs 40 with an additional leg 42 positioned between the two middle legs 40a. A micrometer 44 is clampingly supported in the vertical section of the L-shaped base member 12 such that the spindle 44a thereof abuts a ball anvil 46 that is suitably secured to the dilatometer module.

A U-shaped test sample support member, generally designated by the reference character 48, is comprised of a tubular member having a first leg 50 adjustably positioned in the passageway 14. A screw 52, threadably mounted in the base member 12, is arranged to bear against the leg 50 and thereby secure the support member 48 in the desired position. The support member 48 is further comprised of a second leg 54 that is arranged to abut one end of a tubular test sample T as shown best in FIG. 4. The other end of the tubular test sample T is supported by a fused quartz tube 56 that terminates in an enlarged head portion 58 having at least one, and preferably a plurality of outlet orifices 60 therein. The head portion 58 is suitably secured, such as by threads, to the free end of the core 2, in the manner described in the aforementioned issued U.S. patent.

Depending upon the size of the test sample and heating and cooling rate thereof, a thermocouple 62 is secured thereto in any one of a number of different arrangements. For example, the thermocouple 62 may just touch the outside surface of the test sample T under a spring load or it may be spotwelded thereto as shown for example in FIG. 1. Alternatively, the thermocouple 62 may be inserted into a small hole formed in the test sample T or the thermocouple 62 may be welded to the inside surface if the test sample is hollow.

For fast heating and cooling it is necessary to use a low mass furnace. An induction heating coil 64 such as shown in FIG. 1 represents such a heat source. The induction heating coil 64 is effective in that in at least one embodiment of this invention, the heat is turned off the instant the current is shut off since the coil 64 is kept at room temperature by circulating a cooling medium, such as tap water, therethrough. Inlet and outlet means 66 and 68, respectively, for the cooling fluid, are shown in FIG. 1. By way of example, using an induction heating coil, the heating time of a specimen to 1,000°C is 15 seconds and cooling time to room temperature is about 8 seconds. If the time is not critical, coil 64 may be a resistive coil which is ohmically heated, in which case it would take some 2 minutes to heat the specimen and about 3 minutes to cool it.

Figure 4:
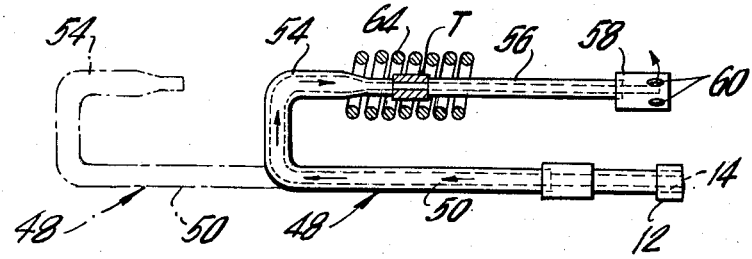
FIG. 4 is a fragmentary, schematic view illustrating two positions of the test sample support means of the dilatometer shown in FIG. 1.

To load the test sample T, the U-shaped support member 48 is moved to the left to the phantom position shown in FIG. 4. With the test sample T in place, the support member 48 is then moved back to the measuring position shown in solid outline in FIG. 4 and then the screw 52 is tightened to secure the support member 48 in its proper place.

Figure 5:
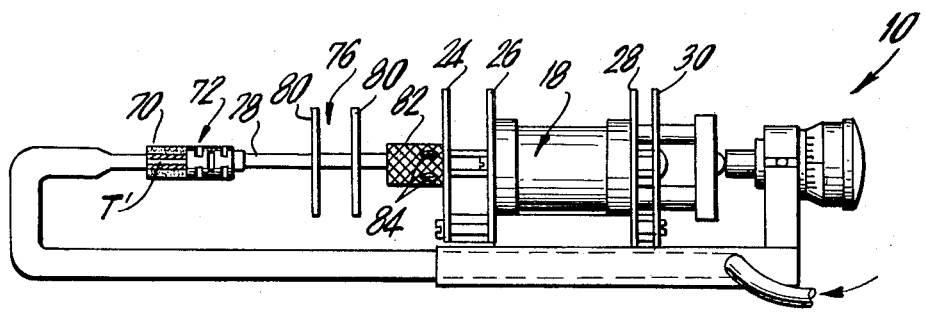
FIG. 5 is an elevational view, similar to FIG. 1, illustrating an alternative embodiment of the present invention.
Figure 7:
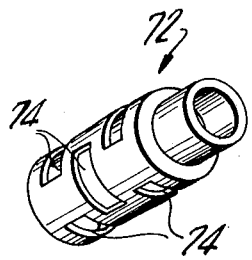
FIG. 7 is a perspective view of another component shown in FIG. 5.
Figure 6:
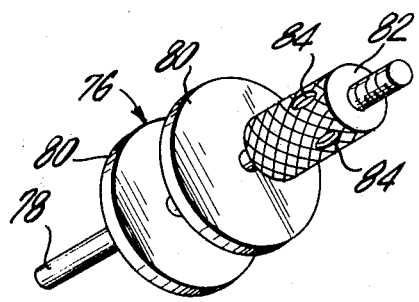
FIG. 6 is a perspective view of the heat sink, shield and radiation component shown in FIG. 5.

An alternative embodiment of the present invention is illustrated in FIG. 5. For purposes of brevity, the components common to the first embodiment will not be described. In the embodiment illustrated in FIG. 6, a zirconium oxide felt sleeve 70 is positioned around the hollow test sample T'. Immediately to the right of the sleeve 70 and the test sample T' there is provided a sintered alumina sleeve 72 (FIG. 6) having a plurality of mass reducing transverse cuts 74 through the wall thereof. The sleeve 72 is, in turn, supported by a heat sink 76 (FIG. 6) that is defined by a tubular rod portion 78 having a pair of axially spaced, metallic thin discs 80 secured thereto. The heat sink 76 terminates in a hollow head 82 having at least one, and preferably a plurality, of outlet orifices 84 formed therein. The heat sink 76 is threadably secured to the core 22 in the manner described in the aforementioned issued U.S. Patent.

Figure 8:
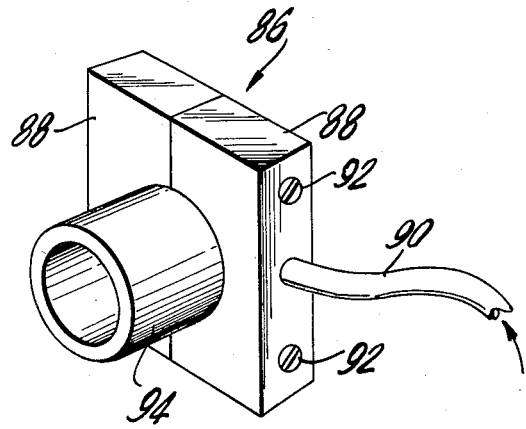
FIG. 8 is a perspective view of alternative heating and quenching means that may be used with the dilatometer comprising the present invention.

An alternative form of quenching head is shown in FIG. 8 and is generally designated by the reference character 86. The structure of FIG. 8 has also been superimposed over the apparatus of FIG. 1 in phantom outline. It will be seen that the quenching head 86 is comprised of a split block 88 having internal passageway means (not shown) for a cooling fluid that is delivered by a tube 90. The split block 88 is secured together by screws 92. A tubular, cylindrical portion 94, integral with the block 88, contains the heating coil (not shown).

From the foregoing it will be appreciated that an improved quenching dilatometer has been provided. With the test sample freely suspended between frictionless mounting rods that are positioned outside the heating zone there will be no expansion of the rods themselves so that no corrections for the measuring system expansion is required. Various lengths of test samples may be readily accommodated and adjusted for by means of a micrometer that is permanently installed. A low mass furnace comprised of an induction heating coil assures fast heating and cooling in combination with a circulating fluid medium through a quenching head. The present invention as described hereinabove permits quick loading of the test sample.

There has been disclosed heretofore the best embodiment of the invention presently contemplated. However, it is to be understood that the various changes and modifications may be made thereto without departing from the spirit of the invention.

What we claim as new and desire to secure by Letters Patent is:

1. A quenching dilatometer for changing the thermal environment of the test sample, said dilatometer comprising the combination of:
   a. a linear, variable, differential transformer including coil means and a core freely floating therein;
   b. first and second cantilevered spring means for independently supporting said coil means and said core with respect to each other;
   c. means for heating the air only in the vicinity immediately surrounding the test sample;
   d. means for supplying a cooling medium to the vicinity immediately surrounding the test sample; and
   e. means for supporting the test sample adjacent said dilatometer, said supporting means comprising a first elongated tube having one end in abutment with one surface of the test sample and a second end in fluid communication with said means for supplying a cooling medium, there being further included a second tube having one end in abutment with another surface of the test sample and a second end coupled to said core.

2. The dilatometer in accordance with claim 1 wherein the second end of said second tube includes outlet orifice means for effluxing the cooling medium.

3. The dilatometer in accordance with claim 1 wherein said heating means comprises an induction heating coil wound about the test sample.

4. The dilatometer in accordance with claim 3 wherein said coil is tubular and means are provided for circulating a cooling fluid therethrough.

5. The dilatometer in accordance with claim 3 further including a quenching head adapted to be positioned about the test sample, said quenching head enclosing the coil.

6. The dilatometer in accordance with claim 1 further including a thermocouple adapted to be placed in contact with the test sample.

7. The dilatometer in accordance with claim 1 wherein said first tube is axially displaceable for supporting different size test samples.

8. The dilatometer in accordance with claim 7 wherein there is further included a base member for receiving the second end of said first tube, said cooling means comprising a passageway in said base member that is in fluid communication with said first tube and a source of cooling medium.

9. The dilatometer in accordance with claim 1 wherein said second tube includes heat sink means intermediate the ends thereof.

10. The dilatometer in accordance with claim 9 wherein said heat sink means comprises at least one metallic disc.

11. The dilatometer in accordance with claim 9 wherein said heat sink means comprises a plurality of metallic discs.

12. The dilatometer in accordance with claim 9 wherein said heat sink means comprises orifice means for effluxing the cooling medium.

13. The dilatometer in accordance with claim 1 further including heat insulation means adapted to be positioned about the test sample.

14. The dilatometer in accordance with claim 13 wherein said heat insulation means comprises a zirconium oxide felt sleeve.

15. The dilatometer in accordance with claim 1 wherein there is further included a sleeve member positioned intermediate said one end of said second tube and the portion of the test sample adjacent thereto.

16. The dilatometer in accordance with claim 15 wherein said sleeve member includes at least one transverse slot through the wall thereof.

17. The dilatometer in accordance with claim 15 wherein said sleeve member includes a plurality of transverse slots through the wall thereof.

18. The dilatometer in accordance with claim 15 wherein said sleeve member is made of sintered alumina.

* * * * *